United States Patent Office 3,377,362
Patented Apr. 9, 1968

3,377,362
1-HALOESTRA-1,3,5(10)-TRIENES
Edward Warren Cantrall, New City, Ransom Brown Conrow, Pearl River, and Seymour Bernstein, New City, N.Y., assignors to American Cyanamid Company, Stamford, Conn., a corporation of Maine
No Drawing. Filed Feb. 28, 1966, Ser. No. 530,344
9 Claims. (Cl. 260—397.4)

ABSTRACT OF THE DISCLOSURE

The preparation of novel 1-haloestra-1,3,5(10)-trienes from 1-amino-3-methoxyestra-1,3,5(10)-trien-17-ones, is described. The estratrienes are useful for their estrogenic hyprocholesteremic and protein anabolic activity.

---

This invention relates to new steroid compounds. More particularly, it relates to estratrienes and methods of preparation thereof.

The novel compounds of this invention may be represented by the following formula:

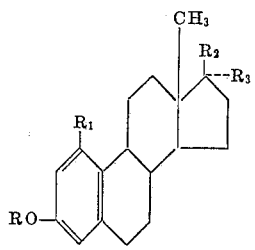

wherein R is hydrogen or lower alkyl, $R_1$ is fluorine, chlorine, bromine or iodine, $R_2$ is hydroxyl or lower alkanoyloxy, $R_3$ is hydrogen, lower alkyl or ethynyl, and $R_2$ and $R_3$ taken together represent oxygen.

The present compounds, are in general, white crystalline materials, relatively soluble in the more common organic solvents, such as for example, ethanol, benzene, acetone and the like.

The compounds of the present invention are prepared from the starting compound, 1-amino-3-methoxyestra-1,3, 5(10)trien-17-one. The latter compound is prepared from known intermediates by methods described hereinafter in the examples. The starting compound is diazotized and reacted with a compound giving the desired substituent in the 1-position. Other modifications can be made in the 3 and/or 17 positions as described in the examples.

Among the compounds which are within the description of the present invention are:

1-fluoro-3-methoxyestra-1,3,5(10)-trien-17-one,
1-chloro-3-methoxyestra-1,3,5(10)-trien-17-one,
1-bromo-3-methoxyestra-1,3,5(10)-trien-17-one,
1-iodo-3-methoxyestra-1,3,5(10)-trien-17-one;
17α-ethynyl-1-fluoro-3-methoxyestra-1,3,5(10)-trien-17β-ol;
1-iodo-3-methoxy-17α-methylestra-1,3,5(10)-trien-17β-ol;
1-chloro-3-hydroxyestra-1,3,5(10)-trien-17-one;
1-bromo-3-methoxyestra-1,3,5(10)-trien-17β-ol; and
17β-acetoxy-1-bromo-3-methoxyestra-1,3,5(10)-triene;
1-iodo-3-methoxyestra-1,3,5(10)-trien-17-one and the like.

The compounds of the present invention when tested in warm blooded animals show estrogenic, hypocholesteremic and protein anabolic activity. They are therefore useful in conditions indicating the use of estrogens, reduction of blood cholesterol and protein replacement therapy.

The compounds of this invention can be used in compositions such as tablets, the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include suitably flavored emulsions with edible oils, such as, cottonseed oil, sesame oil, coconut oil, peanut oil and the like, as well as elixirs and similar pharmaceutical vehicles. Suitable dispersing or suspending agents for aqueous suspensions include synthetic and natural gums, such as, tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials, segregated multiples of any of the foregoing, and other forms as herein described.

The present invention will be described in greater detail in the examples which follow which describe the preparation of substituted estratrienes.

Example 1.—Preparation of 1-hydroxy-3-methoxyestra-1,3,5(10)-trien-17-one

A solution of 13.0 g. (0.03 moles) of 1-(p-nitrophenylazo) - 3 - methoxyestra - 1,3,5(10)-trien-17-one [J. Am. Chem. Soc., 86, 2943 (1964)], in 100 ml. of methylene chloride is added to a stirred mixture of 30 g. of zinc dust in 300 ml. of glacial acetic acid over approximately 10 minutes. The initial temperature of 23° C. soon rises to 40°–45° C. and is maintained in this range during the reaction by occasional cooling in a water bath. An additional 30 g. of zinc dust is added after half of the steroid is fed in. The mixture is stirred for a further 10 minutes then filtered and the residue of zinc washed on the filter with acetic acid. The filtrate is concentrated under reduced pressure to approximately 125 ml., diluted with 500 ml. of water and extracted with chloroform. The extract is washed with two portions of water, dried over magnesium sulfate, concentrated to a volume of 100 ml. and filtered through a bed of magnesium silicate (60 g.) using 300 ml. of chloroform wash. The filtrate is evaporated under reduced pressure to a small volume and crystallized from methanol to give 5.58 g. of grey solid, melting point 198°–208° C., which contains a trace of p-phenylenediamine impurity. An additional 1.0 g. of product, melting point 209°–213° C., is obtained by chromatography of the filtrate on magnesium silicate (60–100 mesh) using 20% ethyl acetate n-hexane as eluant, followed by crystallization of the product from methylene chloride-ether. The total yield of product is therefore 6.58 g. (73%).

Analytically pure material is obtained by chromatography of a sample on activated magnesium silicate as above, followed by crystallization from methanol to give 1-amino-3-methoxyestra-1,3,5(10)-trien-17-one as a white crystalline product, melting point 213°–214° C.

A solution of 600 mg. (2 millimoles) of 1-amino-3-methoxyestra - 1,3,5(10) - trien-17-one (prepared as described above) in 20 ml. of 10% (w/w) sulfuric acid at −10° C. is diazotized by the addition of a solution of 138 g. (2 millimoles) of sodium nitrite in 2 ml. of water below the surface of the liquid. An immediate evolution of nitrogen and separation of a pink solid occurs. The mixture is allowed to warm up to 0° C. and is diluted with water and the product filtered off. The crude solid (610 mg.) is refluxed with benzene and the resulting solution treated with activated charcoal, filtered through diatomaceous earth and placed on a silica gel column (50 g. silica gel in 2.2 cl. internal diameter column). The product is eluted from the column with 2% acetone-benzene (1.6 l.) and crystallized from a methylene chloride, n-hexane mixture to give 430 mg. (71% yield) of off-white crystals melting point 222–231° C. An analytical sample is obtained by two additional crystallizations from a methylene chloride, n-hexane mixture followed by a final crystallization from ethyl acetate. The resulting colorless crystalline product is pure by thin layer chromatography, melting point 231°–234° C.

Example 2.—Preparation of 1-fluoro-3-methoxyestra-1,3,5(10)-trien-17-one

To a well stirred solution of 9.0 g. (0.03 moles) of 1-amino-3-methoxyestra-1,3,5(10)-trien-17-one in 100 ml. of acetic acid plus 200 ml. of 48% aqueous fluoroboric acid at −10 to −15° C. is added a solution of 2.29 g. (0.033 moles) of sodium nitrite in 15 ml. of water below the surface of the liquid. Stirring is continued and the mixture allowed to warm up to +5° C. over 30 minutes and then diluted with 300 ml. of water and extracted with methylene chloride. The extract is washed with water, saturated sodium bicarbonate solution and finally with water and then dried over anhydrous sodium sulfate and filtered through 50 g. of hydrous magnesium silicate using 300 ml. of methylene chloride wash. The filtrate is evaporated under reduced pressure to 8.3 g. of crude solid which is chromatographed on 500 g. of activated magnesium silicate (60–100 mesh). The product is eluted with 12.6 l. of 5% ethyl acetate-petroleum ether (30–75° C.) and crystallized once from cyclohexane-methylene chloride to give 4.25 g. (47% yield) colorless crystals, melting point 177°–180° C.

Example 3.—Preparation of 1-chloro-3-methoxyestra-1,3,5(10)-trien-17-one

To a well stirred solution of 1.2 g. (4.0 millimoles) of 1-amino-3-methoxyestra-1,3,5(10)-trien-17-one in 8 ml. of methylene chloride plus 38 ml. of isobutyric acid containing approximately 146 mg. (4 millimoles) of anhydrous hydrogen chloride is added a solution of 515 mg. (4.4 millimoles) of isoamyl nitrite in 2 ml. of methylene chloride at a temperature of −25° to −30° C. Stirring is continued at this temperature for 15 minutes and then the solution is saturated with dry hydrogen chloride over 5 minutes and allowed to warm up to +5° C. over 30 minutes. The solution is made strongly alkaline by pouring it into ice-cold 20% aqueous sodium hydroxide. The alkaline solution is then extracted with methylene chloride. The extract is washed with water, dried over sodium sulfate and evaporated under reduced pressure to an amber oil which consists of a mixture of 1-chloro and 1-isobutoxy derivatives in a mole ratio of approximately 7:1 respectively. The mixture is refluxed with 30 ml. methanol plus 5 ml. concentrated hydrochloric acid for 2.5 hours and then diluted with water and extracted with methylene chloride. The extract is washed with water, dried over sodium sulfate and filtered through 20 g. of hydrous magnesium silicate using 200 ml. of methylene chloride wash.

The filtrate is evaporated to an oil and crystallized from n-hexane to give 460 mg. of crystalline product, melting point 132°–134° C. The mother liquor is chromatographed on an activated magnesium silicate column (50 g. 60–100 mesh) using 5% ethyl ecetate-hexane as the eluant. The product is crystallized from n-hexane to give 380 mg., melting point 131°–133° C. An additional 60 mg. of product is recovered by preparative thin layer chromatography. Hence the total yield of product is 900 mg. (70%). The combined fractions are crystallized again from n-hexane to give 810 mg. colorless crystals, melting point 132°–134° C.

Example 4.—Preparation of 1-bromo-3-methoxyestra-1,3,5(10)-trien-17-one

A solution of 3.0 g. (10 millimoles) of 1-amino-3-methoxyestra-1,3,5(10)-trien-17-one in 40 ml. of acetic acid plus 30 ml. of 1 N sulfuric acid is diazotized by the addition of a solution of 760 mg. (11 millimoles) of sodium nitrite in 6 ml. of water below the surface of the liquid at −25° C. The solution is stirred for one to two minutes and then to this is added a cooled solution of 4.0 g. (28 millimoles) of freshly prepared cuprous bromide (Vogel, Practical Organic Chemistry, 1948, p. 187) in 20 ml. of 48% aqueous hydrobromic acid. The mixture is stirred and allowed to warm up to +10° C. over 15 minutes then diluted with 350 ml. of water and extracted with methylene chloride. The extract is washed with water, saturated sodium bicarbonate solution and finally with water then dried over sodium sulfate and evaporated under reduced pressure to a glass which consisted of a mixture of the 1-bromo, 1-acetoxy and 1-hydroxy derivatives in a mole ratio of approximately 3.5 to 1 to 3, respectively. The glass is chromatographed on an activated magnesium silicate column (250 g. 60–100 mesh) and the product eluted with 6.5 liters of 5% ethylacetate-petroleum ether (30–75° C.). The product is crystallized twice from methylene chloride-hexane to give 1.11 g. colorless crystals melting point 162°–164° C. Further product (176 mg.) is recovered from the mothr liquors to give a total yield of 1.28 g. (35%) of the 1-bromo derivative.

Further elution of the activated magnesium silicate column with 4.0 liters of 10% ethylacetate-petroleum ether gives 1.45 g. of a mixture which is shown to consist of 350 mg. (10%) 1-acetoxy-3-methoxyestra-1,3,5(10)-trien-17-one and 900 mg. (30%) 1-hydroxy-3-methoxy-estra - 1,3,5(10) - trien - 17-one by preparative thin layer chromatography (silica gel G, lower phase benzene:acetone:water 5:1:4).

Example 5.—Preparation of 1-iodo-3-methoxyestra-1,3,5(10)-trien-17-one

To a solution of 2.0 g. (6.7 millimoles) of 1-amino-3-methoxyestra-1,3,5(10)-trien-17-one in 25 ml. of acetic acid plus 20 ml. of 1 N sulfuric acid at −25° C. is added a solution of 483 mg. (7.0 millimoles) of sodium nitrite in 5 ml. of water below the surface of the liquid and with efficient stirring. After approximately one minute there is added a solution of 2.22 g. (13.4 millimoles) of potassium iodide in 5 ml. of water and the mixture is stirred and allowed to warm up to +5 C. over 15 minutes. The mixture is diluted with water and extracted with methylene chloride. The extract is washed with water, dilute sodium thiosulfate solution and again with water and then dried over sodium sulfate and evaporated under reduced pressure to a dark oil which is chromatographed on 150 g. of silica gel (100–200 mesh). The product (648 mg. 23%) is obtained after elution of the column with 1.0 liters of 3% ethyl acetate-petroleum ether (30°–75°) followed by 3.0 liters of 5% ethyl acetate-petroleum ether. Crystallization from hexane gives colorless crystals with melting point 213°–215° C. Further elution of the column with 500 ml. of 5% acetone-petroleum ether followed by 2.0 l. of 10% acetone-petroleum ether gives 1.392 g. of a mixture which is shown by preparative thin layer chromatography (100 mg. sample separated on silica gel G using lower phase of benzene:acetone:water 5:1:4 as developing solvent) to consist of 348 mg. (15%) 1-acetoxy-3-methoxyestra-1,3,5(10)-trien-17-one and 765 mg. (38%) of 1-hydroxy-3-methoxyestra-1,3,5(10)-trien-17-one.

Example 6.—Preparation of 17α-ethynyl-1-fluoro-3-methoxyestra-1,3,5(10)-trien-17β-ol To a solution of 1.208 g. (4.0 millimoles) of 1-fluoro-3-methoxyestra-1,3,5(10)-trien-17-one in 50 ml. of purified tetrahydrofuran at 37° C. is added 2.41 g. (23.5 millimoles) of 90% lithium acetylide ethylenediamine complex (Foote Mineral Co., Exton, Pa.) in one portion and the mixture stirred for one hour in an atmosphere of argon at 35° C. Thin layer chromatography of reaction mixture indicates the presence of some unreacted starting steroid. An attempt is made to bring the reaction to completion by the addition of two 600 mg. portions of lithium acetylide ethylenediamine complex during one hour at 35° C. followed by sparging the mixture with acetylene gas for an additional two hours at 35° C. However, when the crude product is isolated, quantitative thin layer chromatography shows that it still contains approximately 20% unreacted starting material. The total crude product is dissolved in 25 ml. of purified dimethylacetamide plus 25 ml. of dry benzene the resulting solution is saturated with acetylene gas then 1.2 g. (11.7 millimoles) of lithium acetylide ethylenediamine complex is added and the mixture stirred at 31–33° C. during 1.5 hours in an atmosphere of acetylene. The mixture is cautiously diluted with 150 ml. of water and then evaporated under reduced pressure until all of the benezene has been removed. The resulting solid is filtered off through a bed of diatomaceous eath and washed thoroughly with water. The product is dissolved with hot chloroform and the solution is washed with water, dried over sodium sulfate activated charcoal and evaporated under reduced pressure to 1.25 g. pale tan solid, melting point 170°–177° C. which contained no unreacted starting material.

The crude product is crystallized from methylene chloride-methanol to give 1.0 g. (76%), melting point 180°–183° C. Analytical material is obtained by chromatography on silica gel (100.200 mesh) using 3% acetone-petroleum ether (30–75°) to elute the product followed by a single crystallization from methylene chloride-hexane to give colorless crystals, melting point 184°–186° C.

Example 7.—Preparation of 1-iodo-3-methoxy-17α-methylestra-1,3,5(10)-trien-17β-ol To a well stirred solution of 1-iodo-3-methoxyestra-1,3,5(10)-trien-17-one (1.23 g.) in dry purified tetrahydrofuran (15 ml.) is added, dropwise, a 3 molar solution of methyl magnesium iodide in ether (1.0 ml. Arapahoe Chemical Co.) during 1–2 minutes with cooling by a water bath. The mixture is stirred at room temperature for two hours then refluxed for half an hour, cooled and treated with an ice cold, dilute solution of ammonium chloride. The mixture is extracted with benzene, the extract washed with water, dried over anhydrous sodium sulfate and evaporated in vacuo to give the product of the example.

Example 8.—Preparation of 17α-ethyl-1-iodo-3-methoxyestra-1,3,5(10)-trien-17β-ol Using the procedure described in Example 8 but replacing methyl magnesium iodide by ethyl magnesium bromide there is obtained the product of the example.

Example 9.—Preparation of 1-chloro-3-hydroxyestra-1,3,5(10)-trien-17-one

To molten pyridine hydrochloride (10 g.) is added 1-chloro-3-methoxyestra-1,3,5(10)-trien-17-one (1.0 g.) in one portion as a solid, with stirring and in an atmosphere of nitrogen. The mixture is heated at 200° C. for 20 minutes, then cooled, dissolved in water and the product filtered off. The product is washed thoroughly on the filter with water and dried in a vacuum oven to give the product of the example.

Example 10.—Preparation of 1-bromo-3-methoxyestra-1,3,5(10)-trien-17β-ol

To a solution of 1-bromo-3-methoxyestra-1,3,5(10)-trien-17-one (1.0 g.) in 90% ethanol (100 ml.) is added solid sodium borohydride (1.0 g.) and the mixture stirred at room temperature for 30 minutes. The unreacted sodium borohydride is decomposed by the dropwise addition of 3 N sulfuric acid with stirring and cooling. The mixture is diluted with water (200 ml.) filtered, and the product washed on the filter until neutral and then dried in a vacuum oven to give the product of the example.

Example 11.—Preparation of 17β-acetoxy-1-bromo-3-methoxyestra-1,3,5(10)-triene

A solution of 1-bromo-3-methoxyestra-1,3,5(10)-trien-17β-ol (750 mg.) in acetic acid (15 ml.) and acetic anhydride (1.0 ml.) is heated on the steam bath for 3 hours. The mixture is then diluted with water (50 ml.) and warmed on the steam bath until the unreacted acetic anhydride is hydrolyzed. The mixture is then extracted with methylene chloride, the extract washed with water and saturated sodium bicarbonate solution and dried over anhydrous sodium sulfate. The extract is evaporated to drynes under reduced pressure to give the above product.

We claim:
1. An estratriene of the formula:

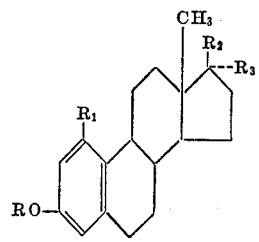

wherein R is selected from the group consisting of hydrogen and lower alkyl, $R_1$ is selected from the group consisting of fluorine, chlorine, bromine and iodine, $R_2$ is selected from the group consisting of hydroxyl and lower alkanoyloxy, $R_3$ is selected from the group consisting of hydrogen, lower alkyl and ethynyl and $R_2$ and $R_3$ taken together represent oxygen.

2. The estratriene in accordance with claim 1, 1-fluoro-3-methoxyestra-1,3,5(10)-trien-17-one.

3. The estratriene in accordance with claim 1, 1-chloro-3-methoxyestra-1,3,5(10)-trien-17-one.

4. The estratriene in accordance with claim 1, 1-bromo-3-methoxyestra-1,3,5(10)-trien-17-one.

5. The estratriene in accordance with claim 1, 1-iodo-3-methoxyestra-1,3,5(10)-trien-17-one.

6. The estratriene in accordance with claim 1, 17α-ethynyl-1-fluoro-3-methoxyestra-1,3,5(10)-trien-17β-ol.

7. The estratriene in accordance with claim 1, 1-iodo-3-methoxy-17α-methylestra-1,3,5(10)-trien-17β-ol.

8. The estratriene in accordance with claim 1, 1-chloro-3-hydroxyestra-1,3,5(10)-trien-17-one.

9. The estratriene in accordance with claim 1, 17β-acetoxy-1-bromo-3-methoxyestra-1,3,5(10)-triene.

References Cited

UNITED STATES PATENTS 2,861,086  11/1958  Jiu _____ 260—397.4
3,264,330  8/1966  Moersch et al. _____ 260—397.5

LEWIS GOTTS, *Primary Examiner.*

T. M. MESHBESHER, *Assistant Examiner.*